Oct. 11, 1949.     D. J. NIGG     2,484,578
TUBE MOUNTING
Filed July 5, 1947     2 Sheets-Sheet 1
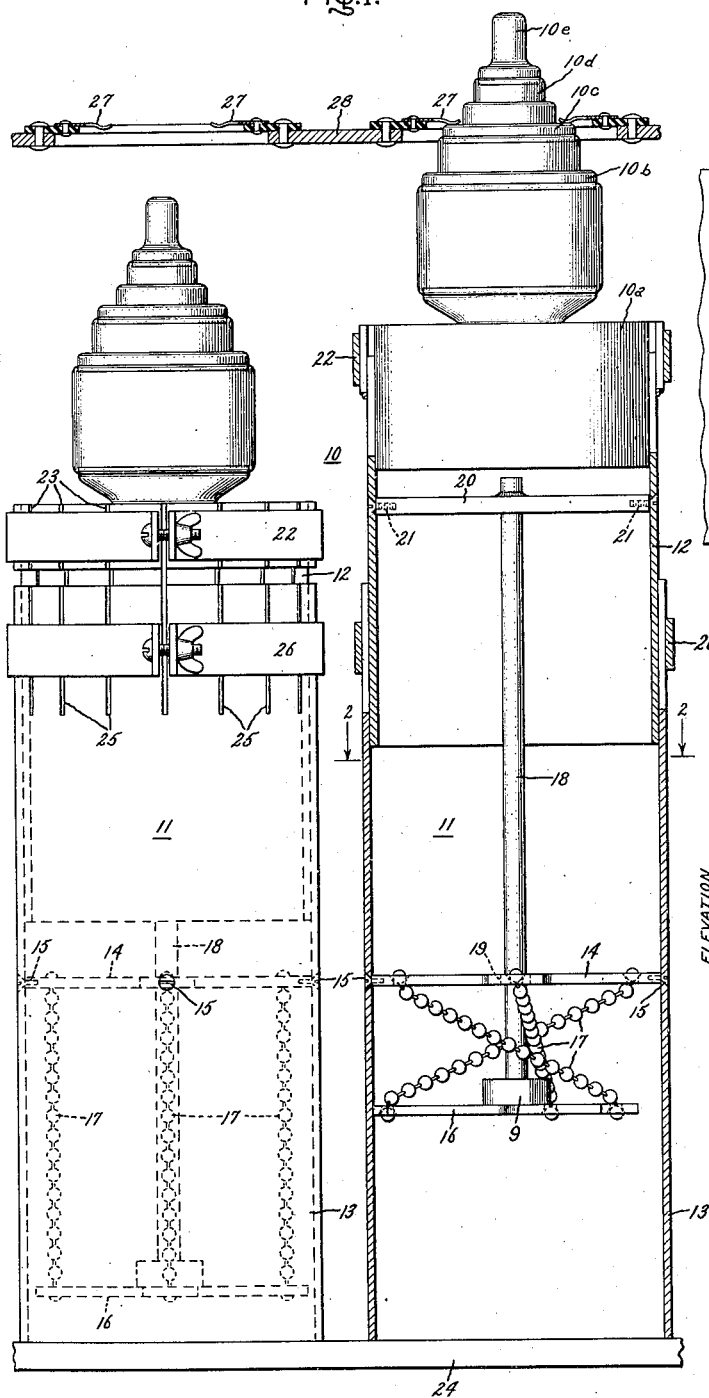
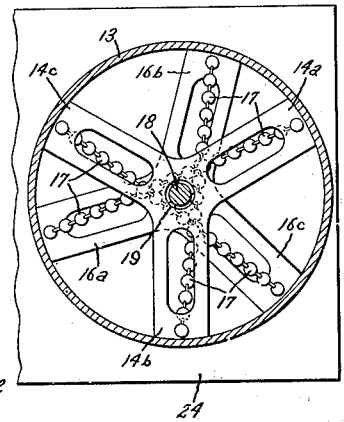
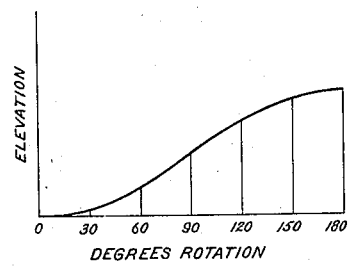
Inventor:
Donald J. Nigg,
by Morton D. Moore
His Attorney.

Oct. 11, 1949.    D. J. NIGG    2,484,578
TUBE MOUNTING
Filed July 5, 1947    2 Sheets-Sheet 2

Inventor:
Donald J. Nigg,
by Merton D Morse
His Attorney.

Patented Oct. 11, 1949

2,484,578

UNITED STATES PATENT OFFICE 2,484,578

TUBE MOUNTING

Donald J. Nigg, Syracuse, N. Y., assignor to General Electric Company, a corporation of New York Application July 5, 1947, Serial No. 759,275

4 Claims. (Cl. 250—27.5)

My invention relates to a tube mounting and, more particularly, to a tube mounting combined with a transmission line structure.

In a high frequency transmission line tuned transmitter or power amplifier, where high power tubes are supported directly by the transmission lines, it is the usual practice to have the lines constructed so as to telescope in order to install or remove the tubes.

In most apparatus employing such a structure, there is usually only room for one person to perform this operation and considerable difficulty is encountered in raising the line and tube to an operating position and at the same time fastening the clamps that hold the line in position. As these tubes are quite heavy, it is difficult to hold the line section, with the tube mounted therein, in place with one hand while fastening the clamps with the other hand. Likewise a similar difficulty is encountered in lowering the line section to remove a tube, because as the clamp is unfastened, due to the weight of the assembly it tends to slip out of the operator's hand and is likely to hit the stops or the supporting structure, damaging the tube elements.

It is an object of my invention to provide an improved tube mounting and transmission line structure suitable for a high-power transmitter, amplifier, or the like, which greatly facilitates the installation and removal of tubes.

Another object is to provide an improved tube mounting for apparatus of this general type which can be installed compactly in a restricted space and which nevertheless permits an operator to change tubes quickly and easily.

A further object of my invention, is to provide an improved vertical tube mounting and transmission line structure in which the tubes may be readily raised and secured in the operating position, or quickly lowered and removed without danger of breakage.

Figure 4:
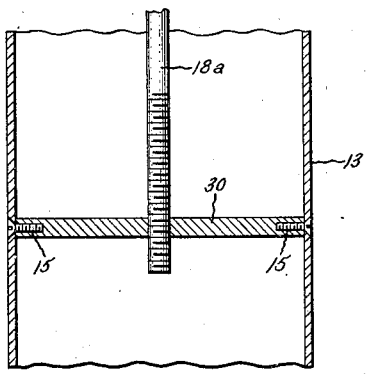
Figure 5:
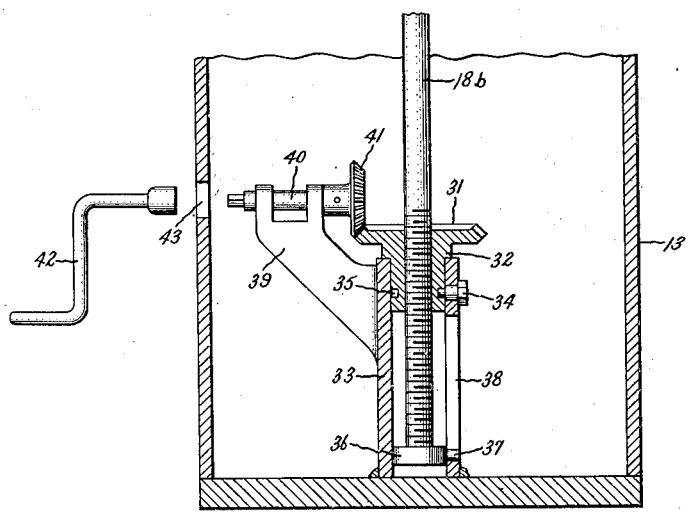

The features of my invention, which I believe to be novel, are set forth with particularity in the appended claims. My invention itself, however, together with further objects and advantages thereof, may best be understood by reference to the following description taken in conjunction with the accompanying drawings in which Fig. 1 is a side elevation view, partly in cross-section, of a tube mounting and transmission line structure embodying the invention. Fig. 2 is a cross-sectional view through one of the transmission lines on the line 2—2 of Fig. 1; Fig. 3 is a curve showing the transfer of rotating motion to vertical motion as the mounting mechanism is actuated; and Figs. 4 and 5 illustrate modifications of the arrangement of Fig. 1. In the various figures like parts are given the same reference numbers.

Referring more particularly to Figs. 1 and 2, I have shown a portion of an anode circuit structure, which may be used in a push-pull amplifier suitable for operation at ultra high frequencies. Since the electrical component elements of such an amplifier are conventional and well known to those skilled in the arts, I have shown only that portion of the structure which is essential to a clear understanding of my invention.

The amplifier comprises a pair of thermionic devices 10 which may be of any suitable type known to the art. For illustration, they are shown as high frequency air-cooled tubes each having a cylindrical anode structure 10a, a pair of annular grid terminals 10b and 10c, and a pair of cylindrical cathode and filament terminals 10d and 10e. The cylindrical anode structures 10a, which include heat dissipating fins and air ducts (not visible in the drawings) also serve as the mounting bases for the tubes 10. They are supported by the transmission lines 11, each of which comprises an upper section 12 and a lower section 13 of a hollow cylinder, the upper section 12 being of a slightly smaller diameter and telescoping in the lower section 13. The transmission line 11 on the left hand side of the drawing, is shown in side elevation on its lowered position, and the one on the right hand side is shown in vertical cross-section in its raised or operating position.

A spider 14, with three radial arms 14a, 14b and 14c, is secured to the wall of the lower section 13 by means of screws 15 or suitable means. The spider 14 is connected to a movable member 16, having the same number of radial arms 16a, 16b and 16c as the spider 14, by means of flexible, cord-like members illustrated as beaded chains 17. When the line 11 is in its lowered position, the chains 17 are parallel and equally spaced about the axis of the line structure as best shown in the left hand side of Fig. 1. A rod 18 is attached to the center of member 16 by means of a pivoted joint 9 and extends upward through a clearance hole 19 in the center of spider 14 to a cross member 20 securely fastened thereto. The joint 9 takes up manufacturing tolerances in the chain 17 and supporting members and allows adjustment for any unequal wear or stretching, but at the same time prevents any relative rotation of the rod 18 and the member 16. The cross member 20 is securely fastened to the wall of the upper line section 12 by means of screws 21 or other suitable means. The bases 10a of the thermionic devices 10 extend downwardly into the upper line sections 12 and are secured therein by any suitable means such as the clamping rings 22. In order to facilitate the clamping action, the end of each line section 12 is slotted with a series of substantially parallel cuts 23. The lower sections 13 are supported rigidly upon the base 24, which may be a shelf in the apparatus cabinet, by any suitable means. The upper end of each section 13 is also provided with a plurality of slots 25 similar to those in the section 12. A clamping ring 26 secures the line sections together so as to form a unitary structure.

The transmission lines in this type of amplifier are generally part of the cooling system as air ducts. For this reason it is desirable that the structures inside the line be so designed as not to block the flow of air. Hence, the members 14 and 16 are each formed with elongated openings, as clearly shown in Fig. 2, to provide minimum interference with air flow.

Assume now that it is desired to install a new tube and that the line sections 12 and 13 are in the positions shown in the left hand side of Fig. 1 with clamping rings 22 and 26 loosened. The tube 10 is first placed in the upper section 12 and clamp 22 is tightened. With the clamp 26 loosened, the upper section 12, together with the thermionic device 10, is rotated in either direction. This rotation is transferred to vertical motion by means of the chains 17, thereby raising the device 10 so that annular grid terminal 10c engages a plurality of contact fingers 27 mounted on a suitable support 28 which may be an upper shelf in the apparatus cabinet. The other grid terminal 10b may also engage similar contact fingers, and the terminals 10d and 10e are likewise raised into position for connection to suitable cathode and heating circuits, but these are omitted from the drawing for simplicity since these details form no part of the present invention. The vertical motion produced by such rotation is shown by the curve in Fig. 3. The flattened upper portion of the curve is designed to occur near the operating position of the tube, thereby providing a high mechanical advantage while the operator holds the tube in position with one hand while tightening the clamp with the other. Similarly, the flattened portion of the curve at the bottom cushions the fall if the tube is lowered too quickly or if the tube and line section are allowed to drop completely. At any elevation position, the chain is a generatrix element of a hyperboloid of revolution whose axis is the axis of the line. As the mechanism is rotated to produce vertical motion, the chains form elements of succeeding families of hyperboloids of revolution whose gore circle diameters decrease with upward vertical motion. Full elevation is obtained in 180 degrees rotation and the device may be rotated in either direction. The mechanism is self-aligning and cannot bind. Another feature of this invention is that it is entirely enclosed within the transmission line tank circuit and does not interfere with the high frequency currents which travel on the outside surface of such a circuit.

While I have shown the members 17 as flexible, they could be rigid, provided they were attached to the members 16 and 19 by universal joints such as a ball and socket joint or the like.

Referring now to Fig. 4, I have shown a modification of the arrangement in Fig. 1. The movable section 12 and discharge device 10 are the same as illustrated in Fig. 1 and have been omitted from Fig. 4 for simplicity. The rod 18a is attached to the section 12 as previously described. The other end of the rod 18a is threaded and screws into a threaded portion of a member 30. The member 30 is attached to the wall of the section 13 by screws 15 or any other suitable means. The device 10 is raised or lowered by rotating the section 12. The rate of travel is determined by the pitch of the threads on the rod 18a and in member 30.

In Fig. 5 I have illustrated a further modification that is especially adapted where larger tubes are employed and a greater mechanical advantage is desired. I have illustrated only a fragmentary cross-section view of the section 13 in which the modification is embodied. The section 12 and associated equipment is the same as in Fig. 1. A rod 18b is attached to the section 12 as illustrated in Fig. 1. The other end of the rod 18b has a threaded portion that engages a threaded portion in a bevel gear 31. The gear 31 has a shoulder 32 that serves as a thrust bearing and is supported upon a housing 33 which is securely attached to the base 24 by any suitable means. A set screw 34 fits into a ring 35 on gear 31 and serves to retain the gear 31 in location. A collar 36 is attached to the end of the rod 18b and has a pin 37 that extends radially into a slot 38 in the housing 33 and prevents rotation of the rod 18b. A bracket 39, which may be a part of the housing 33, supports a shaft 40, upon one end a bevel gear 41 is securely attached and meshes with the gear 31. The other end of the shaft is adapted to fit the removable handle 42 which is inserted through an opening 43 in the wall of the section 13. Rotation of the handle 42 rotates the gear 41 which in turn rotates the gear 31, which by means of its threaded portion imparts vertical motion to the rod 18b. By a selection of gear ratios and pitch of the threads, a wide range of mechanical advantage may be obtained.

The modifications as illustrated in Figs. 4 and 5 produce vertical movement of the tube 10 and upper line section 12, as in the embodiment of Fig. 1, but they may require more than 180 degree rotation for full travel. This is offset, however, by the increased mechanical advantage that may be obtained.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A mounting structure for an electron discharge device comprising a movable support on which said device is mounted, a fixed support, means interconnecting said supports for normally maintaining said device in a non-operating position and for moving said device axially into an operating position in response to rotation of said device and movable support, said means comprising a pair of structural members extending transversely of the axis of said device and rigidly secured to said respective supports and also comprising a link interconnecting said members, said link being arranged to cause relative axial movement of said members in response to said rotation, and means for adjustably clamping said supports together to retain said device in desired axial position.

2. A structure for supporting an electron discharge device, comprising a tubular transmission line element having a pair of relatively movable, axially telescoping sections, one of said sections being mounted in a fixed position and the other of said sections being adapted to support an electron discharge device, a plurality of flexible, cordlike members each having one end supported from the wall of said fixed section at a point lying substantially in a plane transverse to the axis of said element, said movable section having an operating member rigidly secured thereto at a point on one side of said plane and extending axially through said second section to second transverse plane lying on the other side of said first plane, the other end of each of said flexible members being secured to said operating member at a point lying substantially in said second plane, whereby when said movable section is rotated, it is caused to move axially of said fixed section.

3. A structure for supporting an electron discharge device, comprising a telescoping transmission line element having two axial sections, one of said sections being mounted in fixed position and the other section relatively movable and adapted to support an electron discharge device, a plurality of flexible members, each having one end supported from the wall of said fixed section in a transverse plane, said movable section also having an operating member rigidly secured thereto at a point on one side of said plane and extending axially through said second section to a point lying substantially on the other side of said plane, the other ends of said flexible members being secured to said operating member at points lying in a second transverse plane substantially beyond said first plane, whereby when said movable section is rotated it is caused to move axially of said fixed section.

4. A structure for supporting an electron discharge device, comprising a vertical tubular, transmission line element having a pair of relative movable, axially telescoping sections, one of said sections being mounted in fixed position and the other of said sections being adapted to support an electron discharge device, a first transverse spider secured to the wall of said movable section, a second transverse spider secured to the wall of said fixed section, an operating rod extending axially of said line element, said rod having one end secured to said first spider and extending through said second spider, a transverse plate member supported by the other end of said rod, and a plurality of flexible chains having one of their ends secured to said second spider at points spaced substantially uniformly at equal radial distances from said axis and the other of their ends secured to said plate member at substantially corresponding points, whereby when said movable section is rotated, it is caused to move axially of said fixed section.

DONALD J. NIGG.

REFERENCES CITED

The following references are of record in the file of this patent:

UNITED STATES PATENTS

| Number | Name | Date |
|---|---|---|
| 507,807 | Green | Oct. 31, 1893 |
| 1,545,639 | Cohen | July 14, 1925 |
| 1,915,802 | Roshnell | June 27, 1933 |
| 1,930,524 | Laport | Oct. 17, 1933 |
| 1,945,749 | Moran | Feb. 6, 1934 |